US00RE50412E

(19) United States
(12) Reissued Patent
Fey

(10) Patent Number: US RE50,412 E
(45) Date of Reissued Patent: May 6, 2025

(54) SYSTEM AND METHOD FOR COUPLING AN IMPLEMENT TO A WORK VEHICLE

(71) Applicant: BLUE LEAF I.P., INC., Wilmington, DE (US)

(72) Inventor: Alexander Fey, Cary, NC (US)

(73) Assignee: CNH Industrial America LLC, New Holland, PA (US)

(21) Appl. No.: 18/141,065

(22) Filed: Apr. 28, 2023

Related U.S. Patent Documents

Reissue of:
(64) Patent No.: 11,041,284
Issued: Jun. 22, 2021
Appl. No.: 15/437,305
Filed: Feb. 20, 2017

(51) Int. Cl.

| | |
|---|---|
| ***E02F 3/36*** | (2006.01) |
| ***A01B 71/06*** | (2006.01) |
| ***E02F 3/34*** | (2006.01) |
| ***E02F 3/43*** | (2006.01) |
| ***E02F 9/20*** | (2006.01) |
| ***E02F 9/26*** | (2006.01) |

(52) U.S. Cl.
CPC ..... *E02F 3/3663* (2013.01); *A01B 71/063* (2013.01); *E02F 3/3627* (2013.01); *E02F 3/3636* (2013.01); *E02F 3/364* (2013.01); *E02F 9/265* (2013.01); *E02F 3/3414* (2013.01); *E02F 3/3604* (2013.01); *E02F 3/434* (2013.01); *E02F 9/2083* (2013.01)

(58) Field of Classification Search
CPC ..... E02F 3/3604; E02F 3/3663; E02F 3/434; E02F 9/265
See application file for complete search history.

(56) References Cited

U.S. PATENT DOCUMENTS 3,272,264 A 9/1966 Antolini
3,441,091 A 4/1969 Helling
(Continued)

FOREIGN PATENT DOCUMENTS

DE 102013002622 A1 * 9/2014 ..... B66F 9/18
EP 0104302 4/1984
(Continued)

OTHER PUBLICATIONS

Machine Translation of DE 102013002622 A1, Sep. 4, 2014. (Year: 2014).*
(Continued)

*Primary Examiner* — William E Dondero
(74) *Attorney, Agent, or Firm* — Rickard K. DeMille; Rebecca L. Henkel; Peter K. Zacharias

(57) ABSTRACT

A system for coupling an implement to a work vehicle includes a controller comprising a memory and a processor, wherein the controller is configured to receive a first signal indicative of a distance between a protrusion of a connector assembly of an arm of the work vehicle and a receiver assembly of the implement. While the first signal is less than a first threshold, the controller is configured to instruct a first actuator to rotate the connector assembly of the work vehicle, instruct a drive system to move the work vehicle toward the implement, instruct a second actuator to lift the arm of the work vehicle, or a combination thereof, such that the protrusion of the connector assembly engages a recess in the receiver assembly.

20 Claims, 10 Drawing Sheets

(56) References Cited

U.S. PATENT DOCUMENTS

| | | | |
|---|---|---|---|
| 3,705,656 | A | 12/1972 | Hunger |
| 3,913,684 | A | 10/1975 | Casey et al. |
| 4,150,504 | A | 4/1979 | Asche |
| 4,153,117 | A * | 5/1979 | Freese |
| 4,286,674 | A * | 9/1981 | Noble et al. |
| 4,462,172 | A * | 7/1984 | Caron |
| 4,488,850 | A * | 12/1984 | Wernimont |
| 5,040,615 | A * | 8/1991 | Fletcher |
| 5,082,065 | A | 1/1992 | Fletcher |
| 5,348,226 | A | 9/1994 | Heiniger |
| 5,528,843 | A | 6/1996 | Rocke |
| 5,577,373 | A | 11/1996 | Panoushek |
| 5,802,489 | A | 9/1998 | Orbach |
| 5,857,825 | A | 1/1999 | Rice |
| 6,241,455 | B1 | 6/2001 | Schupback |
| 6,301,811 | B1 * | 10/2001 | Gilmore, Jr. |
| 6,332,747 | B1 | 12/2001 | Lee |
| 6,360,459 | B1 | 3/2002 | Brookhart |
| 6,378,276 | B1 | 4/2002 | Dorge |
| 6,791,488 | B2 | 9/2004 | Diekhans |
| 6,860,705 | B1 * | 3/2005 | Dietrich et al. |
| 6,962,475 | B2 * | 11/2005 | Fatemi |
| 7,290,977 | B2 | 11/2007 | Albright |
| 7,331,749 | B2 | 2/2008 | Vachon |
| 7,426,796 | B2 * | 9/2008 | Cunningham et al. |
| 7,494,314 | B2 * | 2/2009 | Bares et al. |
| 7,618,229 | B2 * | 11/2009 | Boling et al. |
| 7,832,127 | B2 * | 11/2010 | Hill |
| 7,992,369 | B2 | 8/2011 | Coers |
| 8,240,970 | B2 | 8/2012 | Bricker |
| 8,408,862 | B1 | 4/2013 | Westendorf |
| 8,560,182 | B2 | 10/2013 | Ringwald |
| 8,596,901 | B1 * | 12/2013 | Popp |
| 8,646,545 | B1 * | 2/2014 | Elliott |
| 8,727,379 | B2 | 5/2014 | Goeggelmann |
| 8,821,104 | B2 * | 9/2014 | Yasuda et al. |
| 9,334,623 | B2 * | 5/2016 | Billaud |
| 9,615,497 | B2 | 4/2017 | Bassett |
| 9,775,276 | B2 | 10/2017 | Hyder |
| 9,992,923 | B2 | 6/2018 | Friggstad |
| 10,194,581 | B2 | 2/2019 | Mangen |
| 10,195,913 | B2 | 2/2019 | Thompson |
| 10,501,910 | B2 | 12/2019 | Wu |
| 10,731,318 | B2 | 8/2020 | Seacat |
| 2006/0245903 | A1 | 11/2006 | Albright |
| 2010/0024412 | A1 | 2/2010 | Hyodo |
| 2010/0071987 | A1 | 3/2010 | Hyodo |
| 2010/0076652 | A1 | 3/2010 | Hyodo |
| 2010/0152981 | A1 | 6/2010 | Nishi |
| 2011/0274482 | A1 | 11/2011 | Fortin |
| 2011/0313625 | A1 * | 12/2011 | Miller et al. |
| 2012/0004814 | A1 | 1/2012 | Hyodo |
| 2012/0190795 | A1 | 7/2012 | Goto |
| 2012/0271519 | A1 | 10/2012 | Nishi |
| 2013/0004280 | A1 | 1/2013 | Zhang |
| 2013/0119634 | A1 | 5/2013 | Camp |
| 2013/0214519 | A1 | 8/2013 | Theriault |
| 2013/0256053 | A1 | 10/2013 | Shirao |
| 2014/0212846 | A1 * | 7/2014 | Miller et al. |
| 2015/0020892 | A1 * | 1/2015 | Behr et al. |
| 2015/0039187 | A1 | 2/2015 | Friebel |
| 2015/0081178 | A1 | 3/2015 | Billaud |
| 2015/0127230 | A1 | 5/2015 | Blunier |
| 2015/0211281 | A1 | 7/2015 | Krupke |
| 2015/0247513 | A1 | 9/2015 | Morris |
| 2015/0266348 | A1 | 9/2015 | Hauler |
| 2015/0322649 | A1 | 11/2015 | Fleischmann |
| 2016/0108602 | A1 | 4/2016 | Singh |
| 2017/0245416 | A1 | 8/2017 | Hyder |
| 2017/0335540 | A1 | 11/2017 | Hill |
| 2018/0238015 | A1 | 8/2018 | Fey |
| 2018/0238016 | A1 | 8/2018 | Seacat |
| 2019/0338809 | A1 | 11/2019 | Clark |
| 2020/0347573 | A1 | 11/2020 | Seacat |
| 2020/0347574 | A1 | 11/2020 | Herrig |

FOREIGN PATENT DOCUMENTS

| | | | |
|---|---|---|---|
| EP | 0104302 | A1 | 4/1984 |
| FR | 1350332 | | 1/1964 |
| FR | 1350332 | A | 1/1964 |
| JP | 5610402 | B2 | 10/2014 |
| WO | WO2008138932 | | 11/2008 |
| WO | WO 2008138932 | A1 | 11/2008 |

OTHER PUBLICATIONS

Salger, P. et sl.; "Autonomous Coupling System for Goods Rail Traffic, a robotic solution for marshalling yards handling hook-and-chain couplings"; 2018 International Symposium on Power Electronics, Electrical Drives, Automation and Motion (SPEEDAM); IEEE Conference Paper, pp. 443-448; 2018 (6 pages).

Abdullah, S. C. et al.; "Robot arm simulation using 3D software application with 3D modeling, programming and simulation support"; 2016 International Symposium on Micro-NanoMechatronics and Human Science (MHS); IEEE Conference, pp. 1-3; 2016 (3 pages).

European Search Report for European Application No. 18157492.2, dated Jul. 10, 2018 (10 pages).

European Search Report for European Application No. 18157492.2, dated Nov. 30, 2018 (12 pages).

Robot arm simulation using 3D software application with 3D modeling, programming and simulation support; Sukarnur Che Abdullah et al.; 2016 International Symposium on Micro-NanoMechatronics and Human Science (MHS); pp. 1-3; IEEE Conferences; year 2016.

Autonomous Coupling System for Goods Rail Traffic a robotic solution for marshalling yards handling hook-and-chain couplings Philipp Salger;Franz Jost;Peter Gratzfeld; 2018 International Symposium on Power Electronics, Electrical Drives, Automation and Motion (SPEEDAM); IEEE Conference Paper (Year 2018).*

U.S. Appl. No. 15/437,319, filed Feb. 20, 2017, Daniel O. Seacat.

U.S. Appl. No. 16/401,813, filed May 2, 2019, Kenneth Herrig.

U.S. Appl. No. 16/401,807, filed May 2, 2019, Daniel Owen Seacat.

* cited by examiner

SYSTEM AND METHOD FOR COUPLING AN IMPLEMENT TO A WORK VEHICLE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is an application for reissue of U.S. Pat. No. 11,041,284.*

BACKGROUND

The present disclosure relates generally to a system and method for coupling an implement to a work vehicle.

Certain work vehicles (e.g., tractors, harvesters, skid steers, etc.) couple to implements configured to perform work. The implements may include blades, augers, backhoes, trenchers, buckets, rakes, brooms, grapples, or other suitable pieces of equipment. The implements may couple to the work vehicle to form one or more connections. To couple the implement to the work vehicle, an operator of the work vehicle may move the work vehicle and/or an arm of the work vehicle in a precise manner to align locking feature(s) on the implement with corresponding locking feature(s) of the work vehicle. It is not uncommon for the operator move the work vehicle and/or the arm multiple times before the implement and work vehicle are properly aligned for coupling. Additionally, implements that are not directly coupled to a frame of the work vehicle may only be supported by an arm of the work vehicle, leading to a decreased capacity for performing work.

Certain work vehicles (e.g., skid steers, tractor loader backhoe) have an arm configured to support the implement. For example, the arm may support a dozer blade to facilitate earth-moving operations. Accordingly, the horizontal forces experienced by the dozer blade are transmitted to the chassis of the work vehicle through the arm. Unfortunately, the maximum force rating of the dozer blade may be limited due to this arrangement.

BRIEF DESCRIPTION

In one embodiment, a system for coupling an implement to a work vehicle includes a controller comprising a memory and a processor, wherein the controller is configured to receive a first signal indicative of a distance between a protrusion of a connector assembly of an arm of the work vehicle and a receiver assembly of the implement. While the first signal is less than a first threshold, the controller is configured to instruct a first actuator to rotate the connector assembly of the work vehicle, instruct a drive system to move the work vehicle toward the implement, instruct a second actuator to lift the arm of the work vehicle, or a combination thereof, such that the protrusion of the connector assembly engages a recess in the receiver assembly.

In another embodiment, a system for coupling an implement to a work vehicle includes a user interface configured to output a first signal indicative of an activation of an automated coupling process. The system also includes a first sensor disposed on a connector assembly of an arm of the work vehicle and configured to output a second signal indicative of a distance between a protrusion of the connector assembly and a receiver assembly of the implement. The system further includes a controller including a memory and a processor. The controller is configured to perform the automated coupling process by receiving the first signal from the user interface indicative of the activation of the automated coupling process, initiating the automated coupling process upon receiving the first signal, and receiving the second signal from the first sensor. While the second signal is less than a first threshold and after the automated coupling process has been initiated, the controller is configured to perform the automated coupling process by instructing a first actuator to rotate the connector assembly, instructing a drive system to move the work vehicle toward the implement, instructing a second actuator to lift the arm of the work vehicle, or a combination thereof, such that the protrusion of the connector assembly engages a recess in the receiver assembly.

In a further embodiment, a method for coupling an implement to a work vehicle includes receiving, via a controller, a first signal indicative of a distance between a protrusion of a connector assembly of an arm of the work vehicle and a receiver assembly of the implement. The method also includes instructing, via the controller while the first signal is less than a first threshold, a first actuator to rotate the connector assembly of the work vehicle, a drive system to move the work vehicle toward the implement, a second actuator to lift the arm of the work vehicle, or a combination thereof, such that the protrusion of the connector assembly engages a recess in the receiver assembly.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Certain embodiments disclosed herein relate generally to systems and methods for automatically coupling an implement to a work vehicle. Systems and methods disclosed herein include identifying a common starting position for the work vehicle relative to the implement and utilizing "dead reckoning" movements, identifying contact between the implement and the work vehicle via sensors, or a combination thereof. It is to be understood that "dead reckoning" movements are performed with respect to known (e.g. stored) measurements or distances between present positions and target positions. The systems and methods also include instructing actuators of the work vehicle to extend, tilt, retract, or a combination thereof, such that a connector assembly of the work vehicle engages a receiver assembly of an arm of the implement, and instructing locking features to lock the receiver assembly to the connector assembly. To form a second connection, the systems and methods include lifting the implement such that a mounting portion of the implement is aligned with a corresponding mounting feature of the work vehicle, then engaging further locking features to couple the implement to the work vehicle. The second location may be disposed directly on and/or within a frame of the work vehicle. The second location may be located at a vertical position from the ground that is low to the ground. That is, by coupling at a low position of the work vehicle, the implement may apply force directly to frame of the implement close to the wheels and/or the track. In certain embodiments, the vertical position of the implement is within a vertical extent of wheels and/or tracks of the work vehicle. Additionally, the systems and methods include lifting the implement to an operating position after the implement is coupled. In certain embodiments, the coupling process may be initiated by an operator of the work vehicle, at which point a parking brake of the work vehicle may be automatically engaged. Additionally, the parking brake may be automatically disengaged after the coupling process is complete and the implement is in the operating position. In this manner, the implement is automatically coupled to the work vehicle.

Certain embodiments described herein may efficiently distribute forces applied to and/or by the implement. For example, coupling the implement directly to the frame of the work vehicle transmits horizontal forces experienced by the implement directly to the frame of the work vehicle. In work vehicles without a corresponding mounting feature on the frame of work vehicle, all forces of the implement are borne by the arm, thus limiting the maximum force rating of the implement. By additionally coupling to the frame of the work vehicle, the implement force rating may be increased, as compared to the single-connection implements.

Figure 1A:
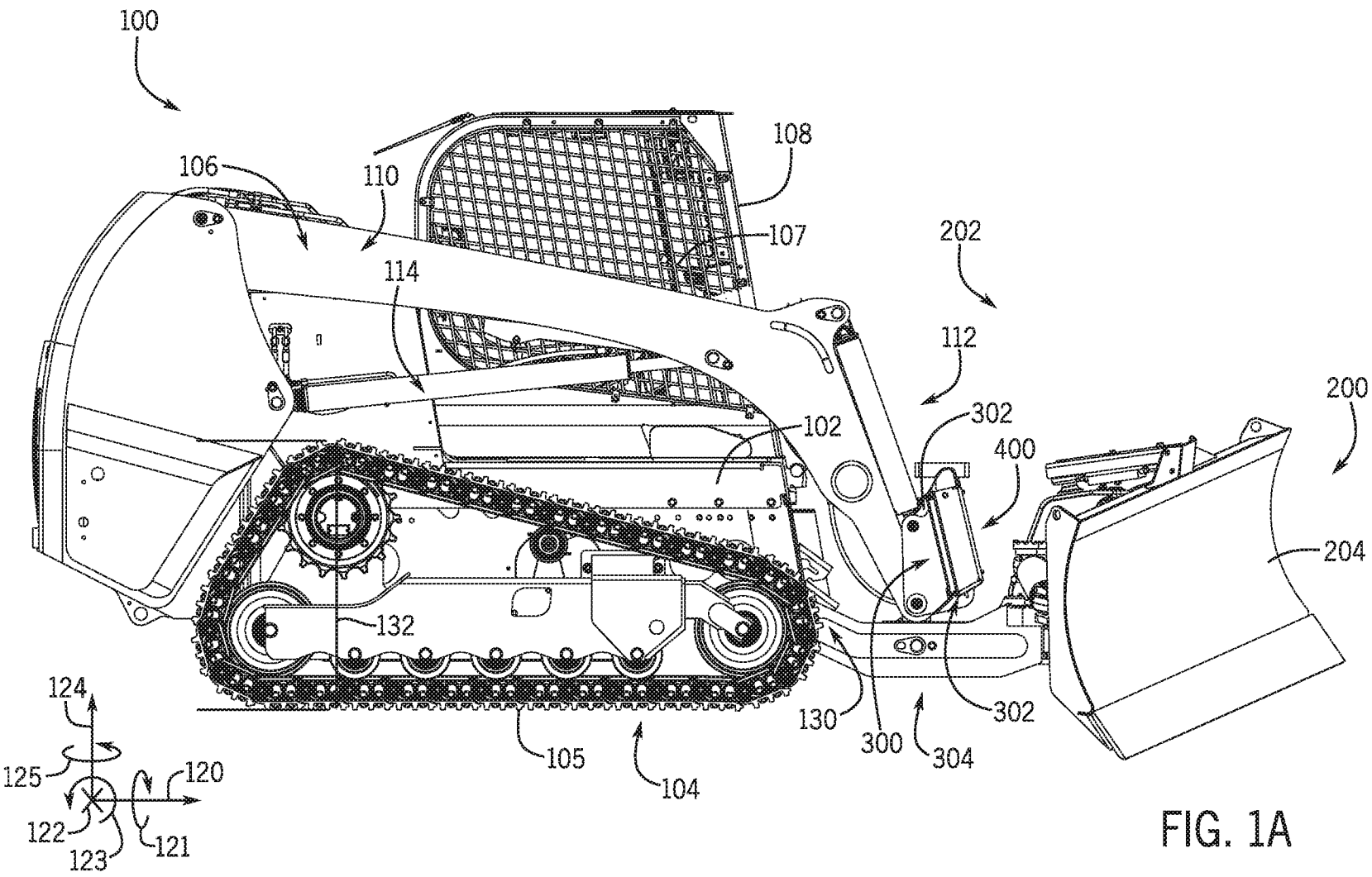
FIG. 1A is a side view of an embodiment of an implement coupled to an embodiment of a work vehicle, in which the implement is in an operating position.

Turning now to the drawings, FIG. 1A is a side view of an embodiment of an implement 200 coupled to an embodiment of work vehicle 100, in which the implement is in an operating position 202. The work vehicle 100 has a frame 102 that is supported and moved by a drive system 104 that includes a rolling assembly 105. Alternately, a plurality of wheels or other appropriate rolling system configured to move the work vehicle 100 may be used. In certain embodiments, the work vehicle includes a parking brake that may stop the drive system from moving the work vehicle 100. An arm assembly 106 includes an arrangement of structural members and actuators controllable by an operator, such as by operator controls 107 (e.g., hand controller(s) or lever(s)), to manipulate an implement 200. As further shown in FIG. 1A, the operator controls 107 for controlling the work vehicle 100 may be located within a cab. The frame 102 structurally supports the cab, which at least partially surrounds the operator. A door may provide operator ingress/egress to the cab, and window(s) or opening 108 may enable an operator to view a work environment exterior of the work vehicle, including the implement 200.

It is to be understood that the term "arm assembly" as generally used here not only refers to the input device or devices (e.g., one or more hand controllers, levers, etc.), but also includes various components, such as pumps, hoses, valving, fittings, hydraulic cylinders, hardware, and so forth to control the implement 200, such as a working assembly 204 of the implement 200 (e.g., bucket, blade), in a desired and controlled manner. The arm assembly 106 may move the implement 200 both when the work vehicle 100 is stopped and when the work vehicle 100 is moving. In the illustrated embodiment, the arm assembly 106 includes arms 110 that extend in front of the work vehicle 100 and couple to the implement 200. In certain embodiments, the arm assembly 106 includes one arm 110 on each lateral side of the work vehicle 100. Each arm 110 includes a tilt actuator 112 configured to manipulate (e.g., rotate, twist, move) a connector assembly 300 of the arm relative to the work vehicle 100. The arm 110 further includes a lift actuator 114 configured to extend or contract to manipulate the arm 110 relative to the work vehicle 100. In other embodiments, the arm assembly 106 may include one actuator, two actuators, three actuators, four actuators, five actuators, or any other quantity of actuators suitable for manipulating the arm 110 and/or the implement 200.

Additionally, the implement 200 may be one of many types of implements. In certain embodiments, the implement 200 may be an asphalt miller, a bale spear, a barrier lift, a bucket, a backhoe, a cold planer, a concrete claw, demolition equipment, a dozer blade, a grapple bucket, a harley rake, a hydraulic brush cutter, a forestry mulcher, a pallet fork, a post driver, a rock saw, a root grapple, a rotary broom, a stump grinder, a tiller, a tree shear, a trench digger, or a vibratory roller, among others.

FIG. 1A further shows multiple axes and movements associated with the axes. These axes and movements are provided to correspond to associated movements of the implement 200 and/or the work vehicle 100. For example, as shown, a longitudinal axis 120 corresponds to a direction of movement of the work vehicle 100 in a longitudinal or "straight-ahead" direction. A rotational movement 121 of the implement 200 or the work vehicle 100 is shown about the longitudinal axis 120, sometimes referred to as "tilt" or roll. FIG. 1A also shows a lateral axis 122 that corresponds to a lateral or side direction with respect to the work vehicle. For example, the lateral axis 122 may align with left and right hand directions of movement. A rotational movement 123 of the implement 200 or the work vehicle 100 about axis 122 is sometimes referred to as a "back-angle" or pitch. A vertical axis 124 extends in a substantially vertical direction with respect to the vehicle. A rotational movement 125 of the implement 200 or the work vehicle 100 about axis 124 is sometimes referred to as "angle" or yaw.

In certain embodiments, multiple sensors 302 are disposed on the implement 200 and/or the connector assembly 300. The sensors 302 may include, for example, inductive proximity sensors, capacitive proximity sensors, strain gauges, load cells, speed sensors, accelerometers, vibration sensors, force or resistance sensors, load level sensors, load tilt or angle sensors, load weight sensors, location stability sensors (e.g., motion caused by waves), or any combination thereof. Signals output by the sensors 302 may be used in part to determine one or more parameters for controlling the work vehicle 100 while the automated coupling process is initiated, performed, and completed. For example, the sensors 302 may generate signals indicative of a proximity between the connector assembly 300 and the implement 200, a strain applied to the connector assembly 300 or the implement 200, a force applied to the connector assembly 300 by the implement 200, among other signals and/or data based on the type of sensor utilized. The sensors 302 may be positioned at various locations on the vehicle. One or more controllers may utilize the signals from the sensors to perform the automated coupling process, as described in detail below. In certain embodiments, certain sensors 302 may be omitted, and the automated coupling process may be performed by dead reckoning from a common starting position identified by the operator of the work vehicle 100 through the window 108.

In the illustrated embodiment, the implement 200 is configured to couple to the work vehicle 100 to form two connections between the implement and the work vehicle. In certain embodiments, the implement 200 may be configured to form only one connection. A receiver assembly 400 of the implement 200 is coupled to the connector assembly 300 of the arm 110 to form a first connection 304, and the implement 200 is coupled to the frame 102 to form a second connection 130. As shown, coupling the implement 200 to the frame 102 to form a second connection 130 enables the work vehicle 100 to apply a larger force to the implement 200 and/or perform a greater amount of work with the implement 200, as compared to an implement coupled to the work vehicle to form only the first connection 304 at the arm 110. While the present embodiments include an implement 200 configured to connect to an underside of the frame 102, it is to be understood that the implement 200 may instead be configured to couple to a front surface of the frame 102 and/or side surfaces of the frame 102.

In the illustrated embodiment, a vertical position of the second connection 130 is within the vertical extent 132 (e.g., maximum height, height) of the rolling assembly 105. That is, the implement 200 couples to the frame 102 of the work vehicle 100 at a vertical location that is positioned vertically within the height of the rolling assembly 105. By coupling at this location, the implement 200 is configured to apply force at a location on the work vehicle 100 near or proximate to the ground beneath the work vehicle 100. Accordingly, forces applied to the work vehicle 100 may be efficiently distributed through the work vehicle 100 and/or the rolling assembly 105 of the work vehicle 100. In embodiments in which the vertical position of the second connection 130 is above the vertical extent 132 of the rolling assembly 105, forces applied to the work vehicle 100 via the implement 200 may cause the work vehicle 100 to tip backward in an undesired manner. Further, in embodiments in which the vertical position of second connection 130 is below the vertical extent 132 of the rolling assembly 105, forces applied to the work vehicle 100 via the implement 200 may cause the work vehicle 100 to tip forward in an undesired manner. Accordingly, it is desirable to couple the implement 200 to the work vehicle at a vertical location that is within the vertical extent 132 of the rolling assembly 105.

Systems and methods are described herein that enable the operator to initiate a coupling process for automatically coupling the implement 200 to the work vehicle 100, thus reducing the time and effort associated with manually coupling the implement 200 to the work vehicle. The automated coupling process may be used to couple the work vehicle 100 to implements 200 to form either one or more connections. In embodiments including two connections, the first connection 304 (e.g., the connection between the connector assembly 300 and the receiver assembly 400) may be substantially similar. That is, implements coupled to work vehicles only by the first connection may be configured to receive the same connector assembly 300 as implements 200 configured to form two connections 304, 130. Accordingly, the method and systems described herein are compatible with implements configured to form only the first connection 304. In certain embodiments, the operator may provide a signal to the work vehicle 100 to indicate the number of connections the implement is configured to form. The work vehicle 100 may accordingly operate in a "heavy-duty mode" configured to perform more work and/or apply larger forces when the implement is coupled to the work vehicle to form two connections. In addition, the work vehicle 100 may operate in a "light-duty mode" when the implement is only coupled to the work vehicle to form one connection. The automated coupling process and the connections established by the process may be better understood with reference to FIG. 1B, depicting the work vehicle 100 when not coupled to an implement 200, and FIG. 1C, depicting the implement when not coupled to a work vehicle 100.

As shown in the present embodiments, one implement 200 is connected to form the two connections 304, 130 to the work vehicle 100. However, in certain embodiments, two implements may be connected to the work vehicle, for example, by connecting a first implement to of the connector assembly 300 and by connecting a second implement to the frame 102 of the work vehicle. In certain embodiments, the first implement is controlled by manipulating the arm 110 of the work vehicle and the second implement is controlled by movement of the work vehicle and/or by additional actuators disposed on the work vehicle suitable for manipulating the second implement. By connecting two implements to one work vehicle, work that is more specific may be performed with the work vehicle.

Figure 1B:
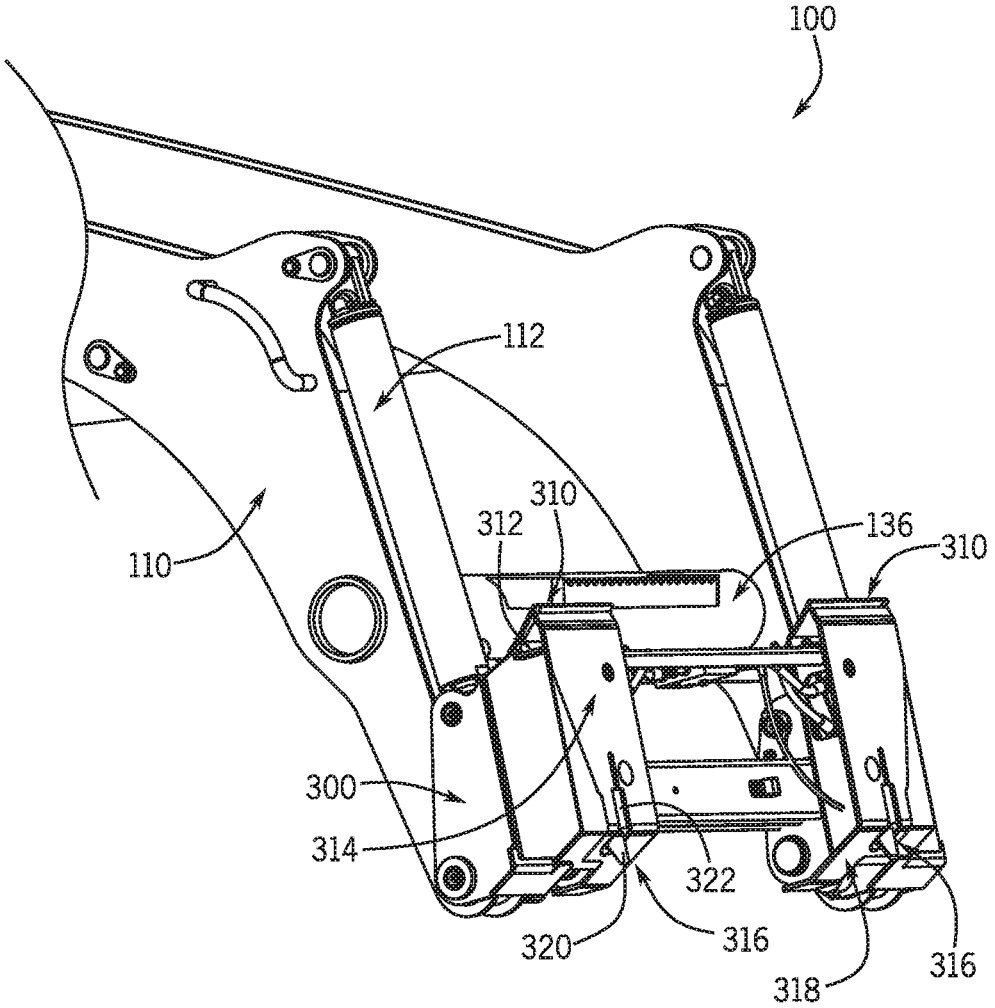
FIG. 1B is a perspective view of an embodiment of a connector assembly that may be employed within the work vehicle of FIG. 1A.
Figure 1B:
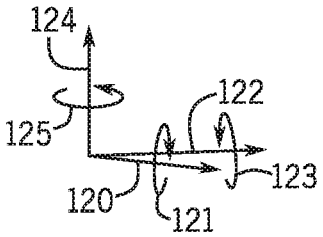
Figure 1C:
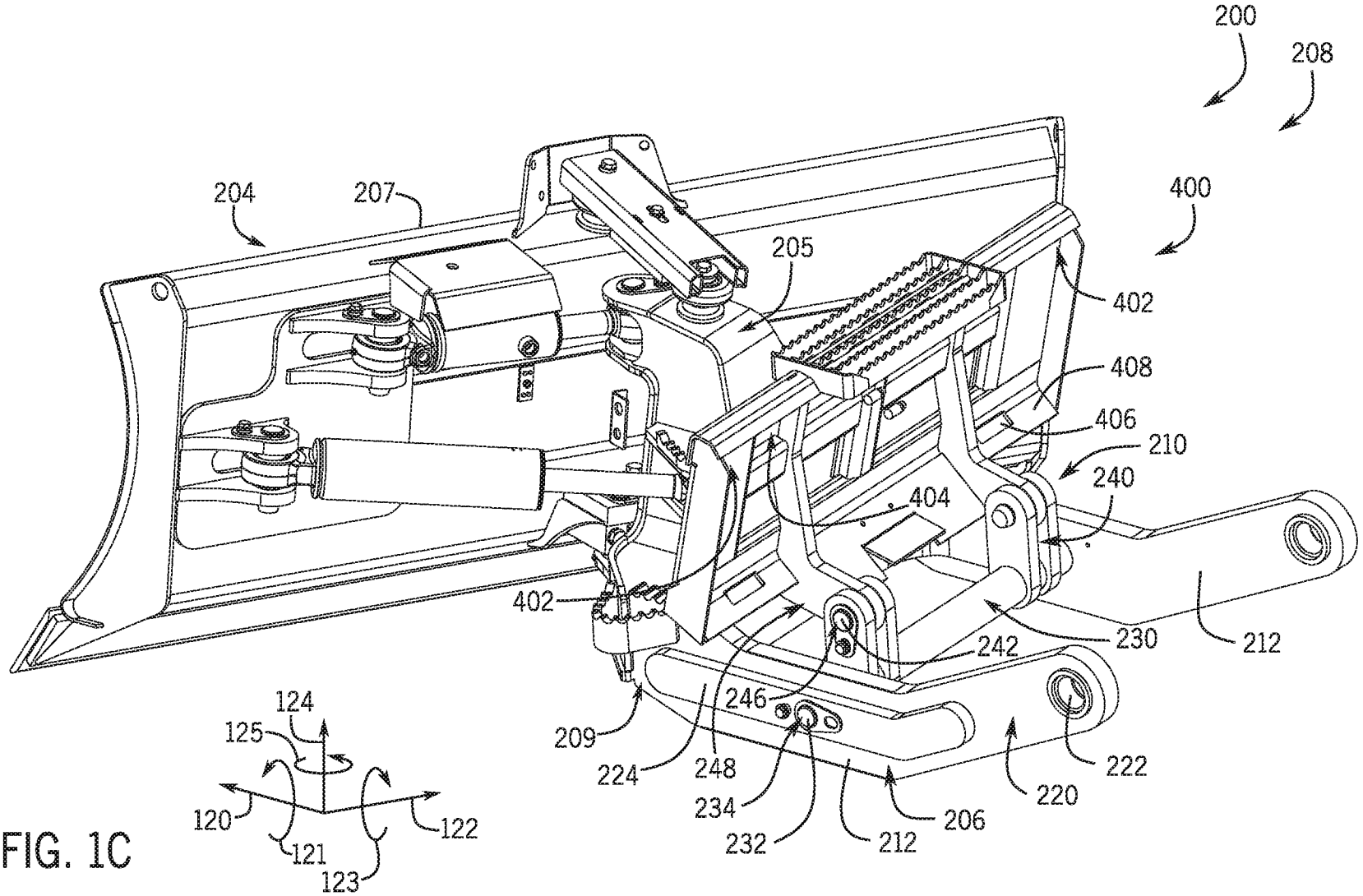
FIG. 1C is a perspective view of the implement of FIG. 1A.

FIG. 1B is a perspective view of an embodiment of the connector assembly 300 that may be employed within the work vehicle of FIG. 1A. As illustrated, the connector assembly 300 of the arm 110 is not coupled to the receiver assembly of the implement. In certain embodiments, the connector assembly 300 is configured to couple to the receiver assembly of the implement to from the first connection. In certain embodiments, the tilt actuator 112 may be instructed to extend or contract by a controller of the work vehicle 100. The tilt actuator 112 tilts the connector assembly 300 in pitch 123 relative to the arm 110. The work vehicle 100 includes multiple features to move the arm 110 and the connector assembly 300, and the connector assembly 300 include multiple features that interface with the receiver assembly, as described herein.

In certain embodiments, the arm assembly 106 includes a support beam 136 coupled each arm 110. The support beam 136 structurally support the arms 110 to enable the work vehicle 100 to support a higher load and/or perform a greater amount of work, as compared to an arm assembly without a support beam. It is to be understood that any suitable number of support beams of any suitable shape may be coupled to each arm 110, or the support beam 136 may be omitted.

In the illustrated embodiments, the connector assembly 300 includes two protrusions 310 disposed on a top portion 312 of the connector assembly 300. In certain embodiments, the protrusions 310 (e.g., stationary protrusions) extend longitudinally in the direction 122 and vertically upward in the direction 124. As shown, the connector assembly 300 includes two protrusions 310, each of which are generally shaped as triangular prisms that extend longitudinally along the direction 122 and vertically along the direction 124. It is to be understood that in other embodiments, the protrusions 310 may have a different shape, such as rectangular prisms, trapezoidal prisms, cylinders, posts, or other shapes suitable for coupling to an implement. Additionally, there may be a different quantity of protrusions such as one, two, three, four, five, six, or any quantity of protrusions suitable for facilitating the coupling process. Further, the protrusions 310 may be disposed on a different portion of the connector assembly, such as an outer portion 314 of the connector assembly, so long as the protrusion is suitable for coupling to an implement.

In certain embodiments, the connector assembly 300 includes locking features 316 for coupling the connector assembly 300 to the receiver assembly of the implement. In the current embodiment, the connector assembly 300 includes two locking features 316 that protrude from a bottom portion 318 of the connector assembly 300. However, in other embodiments, there may be a different quantity of locking features, such as one, two, three, four, five, six, or any quantity of locking features suitable for coupling the connector assembly 300 to the implement. In some embodiments, the locking features 316 are moveable pins that move between positions when manipulated by locking actuators of the connector assembly. In certain embodiments, the locking actuators receive a working fluid (e.g., hydraulic fluid) from a valve assembly instructed by the controller, and the locking actuators move the locking features 316 into the target position.

The locking actuators are configured to transition the locking features 316 between a first position and a second position. In the first position, an extension 320 of each locking feature 316 is fully retracted into a respective receptacle. In certain embodiments, the extensions 320 of the locking features 316 have a tapered edge. In certain embodiments, the extensions 320 may be conical such that a cross section of each extension 320 is arcate. Alternatively, each extension 320 may taper more prominently along one side of the extensions 320 such that any cross section through the extension 320 has at least one flat side (e.g., semicircular). However, the extensions 320 may be any suitable shape (e.g., cylinders, rectangular prisms, triangular prisms, etc.) with any corresponding cross sections (e.g., circles, rectangles, triangles) for coupling the connector assembly 300 to the receiver assembly. In certain embodiments, the receptacles 322 are hollow cylinders that each have a bottom portion aligned in the same plane as a bottom portion 318 of the connector assembly 300. Accordingly, in embodiments in which the locking features 316 are in the first position, the bottom portion 318 of the connector assembly 300 is approximately smooth or planar (i.e., has no protrusions, projections, bumps etc.).

As shown in FIG. 1B, the locking features 316 are in the second position. In the second position, the extensions 320 are extended from the receptacles 322. Accordingly, while the locking features 316 are in the second position, the extensions 320 protrude from both the receptacles 322 and the bottom portion 318 of the connector assembly 300.

FIG. 1C is a perspective view of the implement 200 of FIG. 1A. As illustrated, the implement 200 is not coupled to the work vehicle. The implement 200 includes the working assembly 204, which may be configured to perform work (e.g., plow, dig, plant, etc.). In the illustrated embodiment, the working assembly 204 includes a mounting assembly 205 that couples a blade 207 of the implement to a frame 206 of the implement. In the illustrated embodiment, the mounting assembly 205 of the implement 200 is rigidly coupled (e.g., welded, bolted, non-rotably coupled, etc.) to a distal portion 209 (e.g. second end) of the frame 206 of the implement 200 and rotably coupled to the working assembly 204 of the implement 200. In the illustrated embodiment, the implement 200 also includes a connection system 208. The connection system 208 includes the receiver assembly 400, the frame 206 of the implement 200, and a pivot assembly 210 of the implement 200.

In the illustrated embodiment, the frame 206 of the connection system 208 rotates relative to the working assembly 204 of the implement. The frame 206 is a C-frame and may be formed of a structurally strong material (e.g., steel) to support the weight of the working assembly 204 and transfer horizontal forces (e.g. loads) to the frame 206 of the implement 200. In the illustrated embodiment, the frame 206 includes two arms 212 (e.g. extensions). In further embodiments, the frame of the implement may include more or fewer arms. The frame 206 additionally includes a mounting portion 220 (e.g., first end) at an end of the frame 206 opposite of the distal portion 209. In the illustrated embodiment, the mounting portion 220 includes mounting features 222. In the illustrated embodiment, the mounting features 222 are openings disposed through the mounting portion 220 of the frame. However, the mounting features 222 may be other suitable mounting and/or locking features in further embodiments, such as hooks or pins, among others.

In the illustrated embodiment, the frame 206 includes structural supports 224. The structural supports 224 are disposed on each lateral side of the frame 206. The structural supports 224 are configured to supply the frame 206 with additional strength, as compared to frames without structural supports. In this manner, implements with structural supports may be able to transfer larger loads to the work vehicle.

As shown in FIG. 1C, the pivot assembly 210 is disposed between the frame 206 and the receiver assembly 400 (e.g., between the distal portion 209 and the mounting portion 220 of the frame 206). In the illustrated embodiment, the pivot assembly 210 of the connection system 208 includes a pivot tube 230 disposed between the arms 212 of the frame 206. The pivot tube 230 is rotably connected to arms 212. In the illustrated embodiment, the rotatable connection is provided by tube pins 232 of the pivot assembly 210. The tube pins 232 are disposed through respective openings of the arms 212, such that the pivot tube 230 is rotably connected between the tube pins 232. In certain embodiments, a bushing is disposed circumferentially around each tube pin 232 to provide the rotatable connection between the arms 212 and the pivot tube 230. In this manner, the pivot tube 230 may provide a first point of rotation 234 between the receiver assembly 400 and the frame 206. Further, in certain embodiments, a single tube pin may be disposed through both arms of the frame, instead of one tube pin 232 disposed through each arm 212.

Additionally, in the illustrated embodiment, the pivot assembly 210 includes links 240 rigidly coupled (e.g., welded) to the pivot tube 230. The links 240 are rotably connected to the receiver assembly 400 of the implement 200 via link pins 242. In this manner, the links 240 provide a second point of rotation 246 between the receiver assembly 400 and the frame 206 (e.g., between the receiver assembly 400 and the pivot tube 230). In the illustrated embodiment, there are two links 240 disposed on each lateral side of extensions 248 of the receiver assembly 400. However, in other embodiments, there may be a different number of links and/or extensions.

The receiver assembly 400 of the implement 200 is configured to couple to the connector assembly of the arm of the work vehicle to establish the first connection. The receiver assembly 400 includes two recesses 402 disposed on an inner portion 404 of the receiver assembly 400. The receiver assembly 400 includes locking features 406 through a lower portion 408 of the receiver assembly 400. In the illustrated embodiment, the locking features 406 are openings configured to receive the corresponding locking elements of the connector assembly of the work vehicle. In certain embodiments, there may be more or fewer recesses 402 to match the corresponding locking features (e.g., protrusions) of the connector assembly. Additionally, there may be more or fewer locking features 406 to match the corresponding locking features on the connector assembly. An embodiment of the recesses 402 and the locking features 406 used to couple the receiver assembly 400 to the connector assembly is described with reference to FIG. 1D below.

Figure 1D:
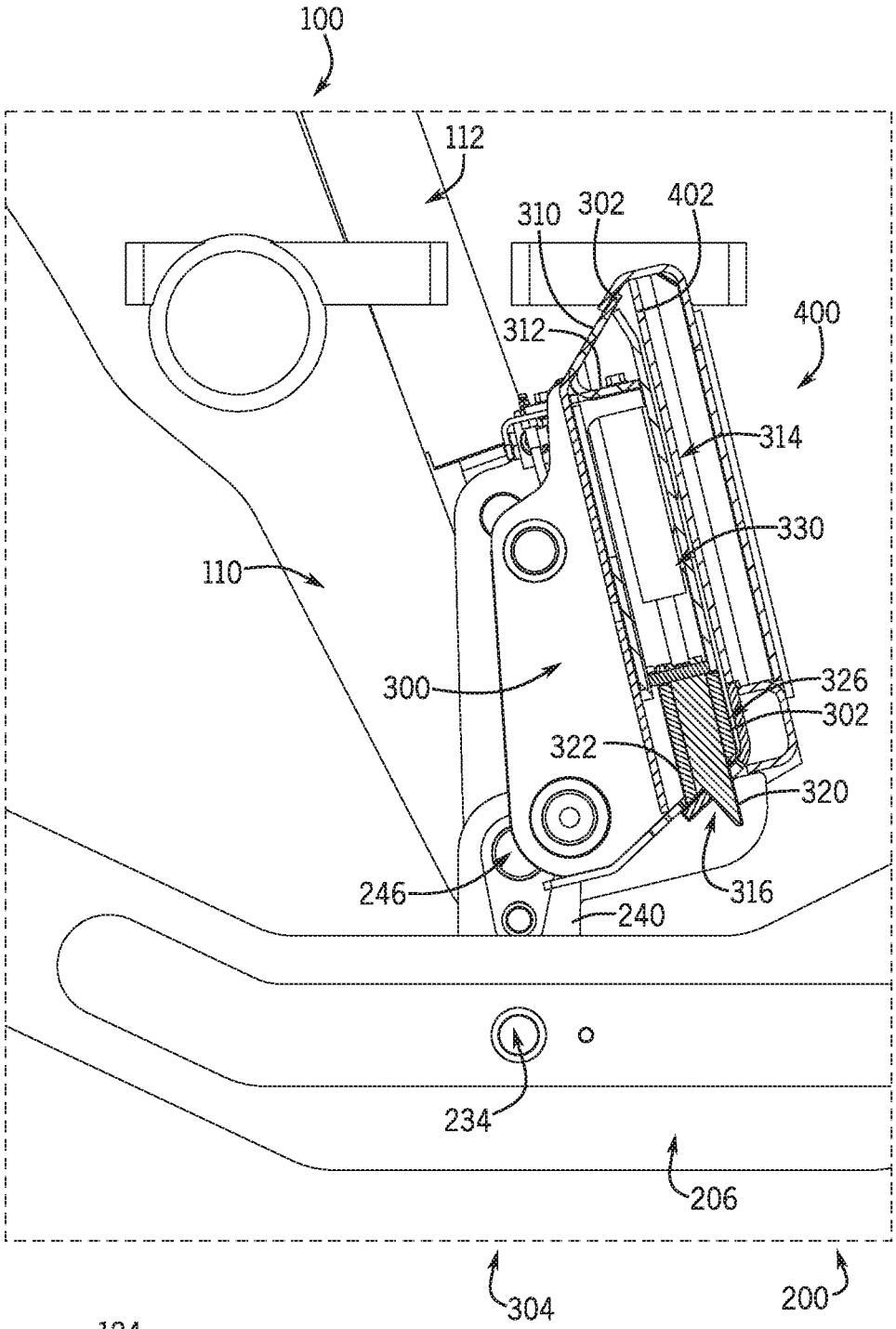
FIG. 1D is a cross-sectional view of the implement of FIG. 1A coupled to the work vehicle of FIG. 1A.
Figure 1D:
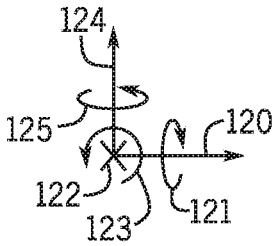

FIG. 1D is a cross-sectional view of the implement 200 of FIG. 1A coupled to the work vehicle 100 of FIG. 1A. As illustrated, the connector assembly 300 of the arm 110 coupled to the receiver assembly 400 of the implement 200 to establish the first connection 304. The cross-section of the cross-sectional view extends in a plane along the directions 120 and 124 to show components of the connector assembly 300 and the implement 200 in detail. As shown, the protrusions 310 of the connector assembly 300 are disposed within (e.g., engage with) the recesses 402 of the receiver assembly 400. Additionally, the locking features 316 are extended to the second position to interface with (e.g., engage with) the corresponding locking features of the receiver assembly 400.

As described in further detail below, in certain embodiments, the connector assembly 300 may be coupled to the receiver assembly 400 by first engaging the protrusions 310 with the recesses 402 of the receiver assembly 400. To do so, the connector assembly 300 may approach the receiver assembly 400 while in a tilted position in which the protrusions 310 are tilted forward in pitch 123 such that the protrusions 310 are angled away from the work vehicle 100 (achieved via the tilt actuator 112). The protrusions 310 may then interface with the recesses 110 of the receiver assembly 400, and then the tilt actuator 112 tilts the connector assembly 300 to a vertical orientation. Then, the locking features 316 are driven into engagement (e.g. to the second position) to interface with the corresponding locking features 406 of the implement to physically couple the connector assembly 300 and the receiver assembly 400 to one another to establish the first connection 304.

The locking features 316 couple the connector assembly 300 to the receiver assembly 400 to establish the first connection 304. In the present embodiments, the locking features 316 are extended to the second position and the extensions 320 are in contact with the corresponding locking features 406 of the receiver assembly 400. As shown, a first locking actuator 330 is disposed inside the connector assembly 300. The first locking actuator 330 is in fluid communication with a valve assembly that provides hydraulic fluid to the actuator to extend and retract the extensions 320. In certain embodiments, the corresponding locking features 406 are openings configured to receive the locking features 316 of the connector assembly 300. Accordingly, when the locking features 316 are in the second position, the extensions 320 extend into the corresponding locking features 406 to couple the connector assembly 300 to the receiver assembly 400 of the implement 200.

The points of rotation 234, 246 enable the receiver assembly 400 to pivot in pitch 123 with respect to the pivot tube and with respect to the frame 206 of the implement 200. The points of rotation 234, 246 provide more flexibility to the implement 200, which may facilitate performing the automated coupling process. The implement 200 distributes a substantial portion of the horizontal forces (e.g., forces extending substantially in a plane formed by the directions 120 and 122, the horizontal component of a force vector, etc.) directly to the frame of the work vehicle 100, as compared to the arms 110. The pivot assembly 210 and the associated points of rotation 234, 246 enable all or a substantial portion of the horizontal forces to be distributed to the frame 102 of the work vehicle 100. For example, if a force with both vertical and horizontal components is applied to the implement 200, a substantial portion of the horizontal component of the force is applied to the frame 102 and a substantial portion of the vertical component is applied to the arms 110. In this manner, the implement 200 may resist larger forces and/or perform more work than implements not connected to the frame 102.

In the present embodiment, the receiver assembly 400 and/or the connector assembly 300 include one or more sensors 302. The sensors 302 are disposed on the protrusions 310 and on a bottom portion 326 of the front portion 314 of the connector assembly 300. The sensors are configured to output signals indicative of distances between components and/or loads on the components, among others. In certain embodiments, the arrangement and quantity of sensors 302 may be varied from the arrangement presently shown. The sensors 302 may be of any suitable sensor type, as described above with reference to FIG. 1A. In certain embodiments, the sensors are communicatively coupled to the controller. The controller receives signals from the sensors 302 and determines one or more parameters useful in controlling the work vehicle based on the signals (e.g., while the work vehicle performs the automated coupling processes.

Figure 1E:
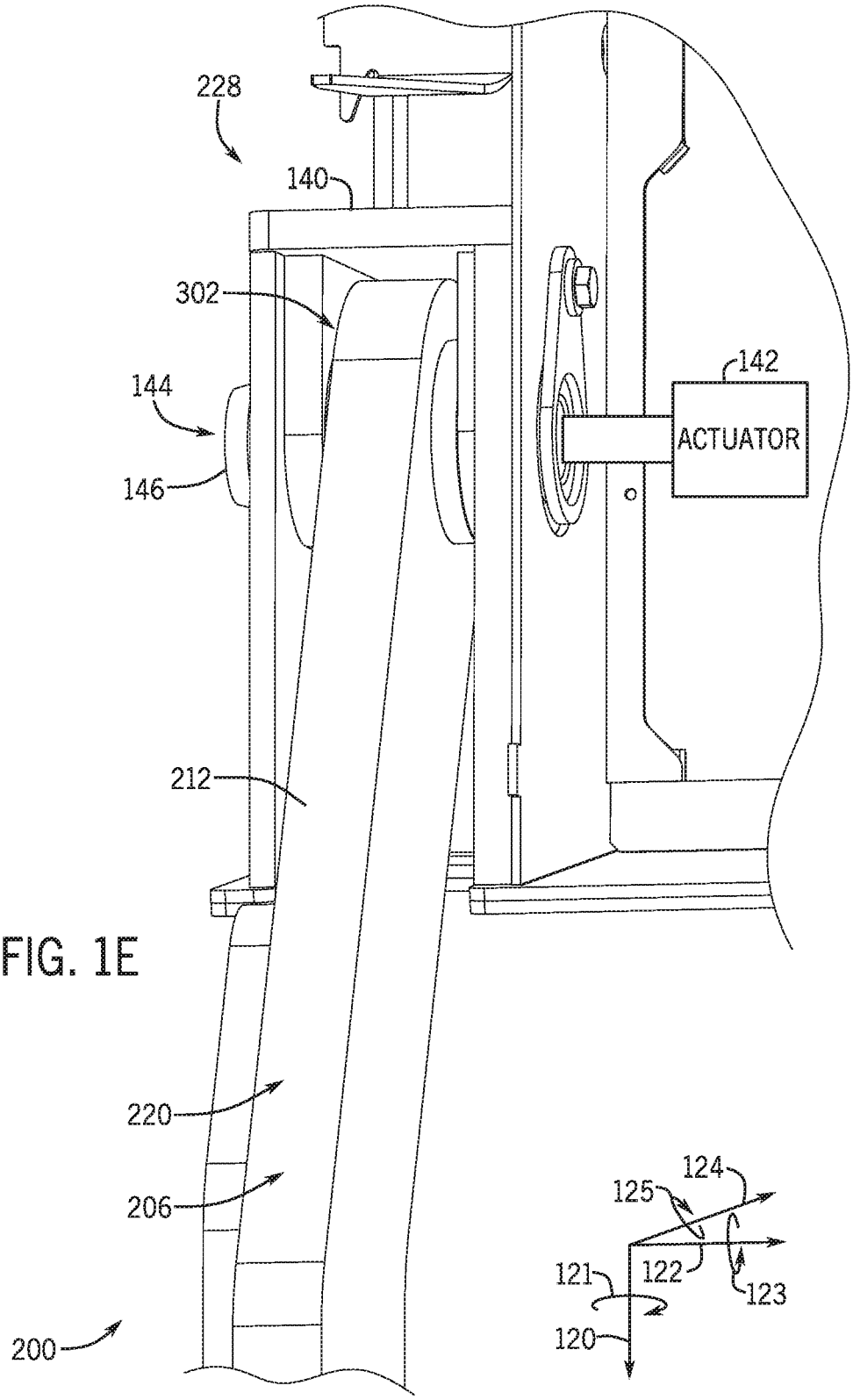
FIG. 1E is a perspective view of an embodiment of a mounting portion of the implement of FIG. 1A coupled to the work vehicle of FIG. 1A.

FIG. 1E is a perspective view of an embodiment of the mounting portion 220 of the implement 200 of FIG. 1A coupled to the work vehicle 100 of FIG. 1A. As shown, the mounting portion 220 of the implement 200 is disposed within in a corresponding mounting feature 140 of the work vehicle 100. FIG. 1E shows the mounting portion 220 and the mounting feature 140 from beneath the work vehicle 100. As shown, the frame 206 of the implement 200 includes the mounting portion 220 at an end of the implement 200 opposite of the working assembly. In the illustrated embodiment, the mounting portion 220 has an opening. In certain embodiments, the mounting portion may have a different type of mounting element (e.g., a hook, a pin, etc.).

In the illustrated embodiment, the corresponding mounting feature 140 of the work vehicle is configured to receive the mounting portion 220 of the implement 200. The corresponding mounting feature 140 may be a receptacle disposed within the frame 102 of the work vehicle. As shown, the corresponding mounting feature 140 is disposed in a bottom portion of the frame 102 of the work vehicle. However, the corresponding mounting feature 140 may be positioned at other suitable positions for coupling the mounting portion 220 to the work vehicle 100. In certain embodiments, an actuator 142 may drive a corresponding locking feature 144 of the work vehicle through the opening of the implement 200, thereby coupling the mounting portion 220 to the corresponding mounting feature 140. In the present embodiments, the corresponding locking feature 144 may be moved automatically by the actuator 142. In this manner, the implement 200 may be coupled to the work vehicle without visual inspection by the operator and/or while the operator is in the cab of the work vehicle 100.

As shown in the present embodiment, the mounting portion 220 is in a mounting position 228. The mounting position 228 may be defined as a position in which the opening of the mounting portion 220 is aligned with a corresponding opening of the corresponding locking feature 144 of the work vehicle 100. In the illustrated embodiment, the corresponding locking feature extends through a first opening of the corresponding mounting feature 140, through the opening of the mounting portion 220 of the implement 200, and through a second opening of the corresponding mounting feature 140. In the illustrated embodiment, a sensor 302 is disposed on the work vehicle 100 and configured to output signal(s) indicative of a position of the mounting portion 220 relative to the corresponding mounting feature 140. Additionally, the actuator 142 is configured to output signal(s) indicative of a position of the actuator 142, which may then be used to determine the position of the locking feature 144 relative to the opening. If the signal from the actuator 142 indicates that the locking feature 144 is extended, the controller may determine that the mounting portion 220 is coupled to the corresponding mounting feature.

As shown in the present embodiment, a locking element 146 of the locking feature 144 is disposed through the opening of the mounting portion 220. The locking elements 146 may include pins and/or extensions that are extended into the openings of the mounting portions 220 by actuator(s) in response to instructions from the controller.

In certain embodiments, the implement 200 may not include the mounting portion, and only the receiver assembly 400 of the implement 200 may be coupled to the connector assembly 300. In such embodiments, the implement 200 is only coupled to the work vehicle 100 to form the first connection. However, the work vehicle 100 may also be configured to couple to implements 200 to from two connections.

Figure 2A:
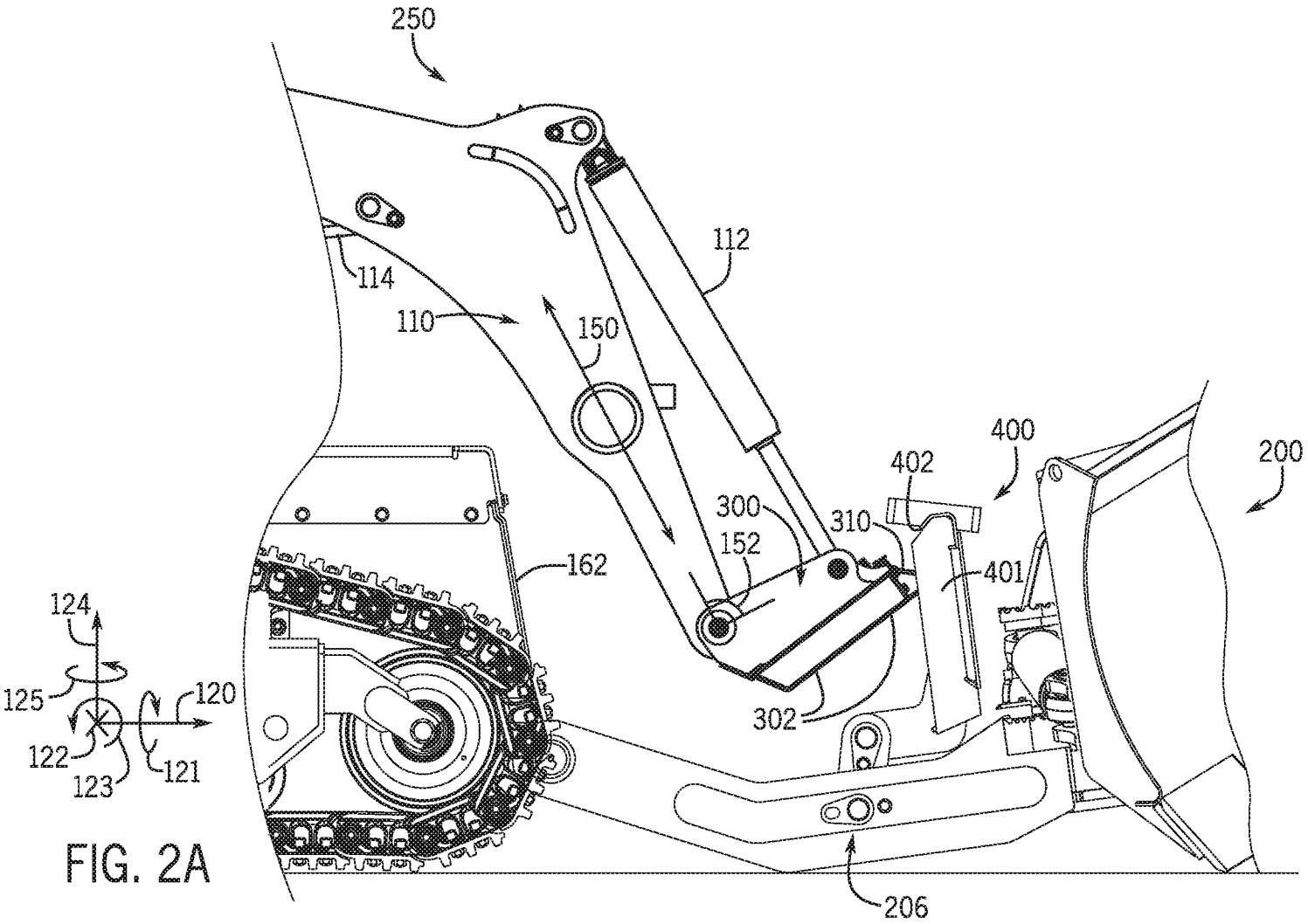
FIG. 2A is a side view of the connector assembly of FIG. 1B adjacent to the implement of FIG. 1A, in which the implement is in a starting position.

FIG. 2A is a side view of the connector assembly 300 of FIG. 1B adjacent to the implement 200 of FIG. 1A, in which the implement 200 is in a starting position 250. In certain embodiments, the starting position corresponds to a position in which the connector assembly 300 is tilted to a target starting angle (e.g., within a threshold angle of the target starting angle). The connector assembly 300 is located a target distance from the receiver assembly of the implement (e.g., within a threshold range of the receiver assembly 400 of the implement 200). In the starting position 250, the tilt actuator 112 may be at least partially extended. As such, the connector assembly 300 is tilted from a longitudinal axis 150 of the arm 110 at a connector angle 152 (e.g., corresponding to the target starting angle). The target starting angle of the connector assembly 300 relative to the longitudinal axis 150 may be about 30 degrees, about 45 degrees, about 75 degrees, or any other suitable angle relative to the axis 150. For example, the target starting angle may be between 100 degrees and 10 degrees, between 75 degrees and 30 degrees, or any other suitable range of angles relative to the axis 150. Additionally, in certain embodiments, the target starting angle and the connector angle 152 may instead be determined relative to the direction/axis 124 or the direction/axis 120.

In certain embodiments, the connector angle 152 is established by the controller. The controller receives signal(s) indicative of the positions of the tilt actuator 112. For example, the controller may instruct the tilt actuator 112 to move to a target connector angle in response to a detected separation distance between the work vehicle 100 and the implement 200. In certain embodiments, the detection of the separation distance initiates the automated coupling process. In certain embodiments, the rotation of the tilt actuator 112 may be the first step of the automated coupling process. In some embodiments, the operator of the work vehicle 100 visually identifies the connector angle 152 and uses the operator controls to adjust the connector angle 152 to the target starting angle or within the threshold range of the target starting angle.

As described above, the starting position 250 may be achieved when the connector assembly 300 is within the threshold distance of the receiver assembly 400. In certain embodiments, the sensors 302 (e.g., load sensors, proximity sensors) disposed on the connector assembly 300 are used to measure a distance between the connector assembly 300 (e.g. the protrusions 310) and the receiver assembly 400 (e.g., the recesses 402). In certain embodiments, the operator may move the work vehicle 100, the arm 110 of the work vehicle, the connector assembly 300, or a combination thereof, until the connector assembly 300 is in the starting position 250 (e.g. within the threshold distance of the starting distance, within the threshold angle of the starting angle, or a combination thereof) before initiating the automated coupling process. The threshold distance may be about 0 cm, 1 cm, 2 cm, 5 cm, 20 cm, 100 cm, or any other suitable distance for starting the automated coupling process. In certain embodiments, the threshold distance may be between 0 and 100 cm, between 5 cm and 50 cm, between 10 cm and 20 cm, or any other suitable range for starting the automated coupling process. In embodiments in which the sensors 302 are a force sensor/strain gauge, the sensors 302 may output a signal indicative of contact between components. However, the signal is also indicative of a position of a component relative to another component because contact identifies a position of the components (e.g., that they are in contact, zero distance between the components, etc.).

In some embodiments, the sensor 302 disposed on or near the protrusion 310 may output a signal indicative of the distance between the protrusion 310 and the respective recess 402 of the receiver assembly 400. The controller may receive the signal and instruct the user interface to alert the operator when the protrusion 310 of the connector assembly 300 is at the target position relative to receiver assembly 400. In addition, the controller may initiate the automated coupling process when the position of the connector assembly 300 is in the target position (e.g. within the target distance, within the target angle). In certain embodiments, the target distance may be instead determined as the distance between the protrusions 310 and a body 401 of the receiver assembly 402 and/or as the distance between a front face 162 of the work vehicle and the implement 200.

Figure 2B:
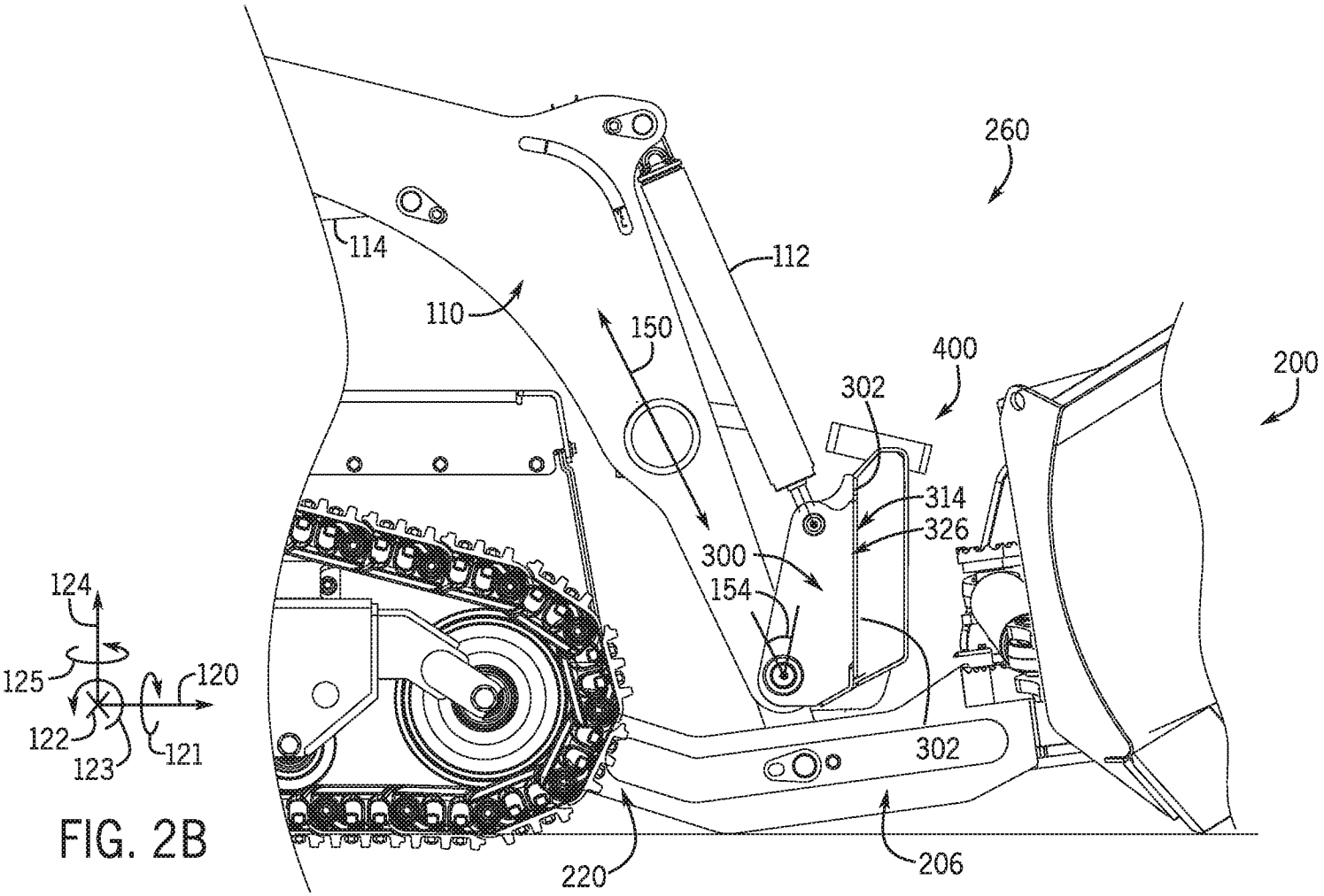
FIG. 2B is a side view of the connector assembly of FIG. 1B partially coupled to the implement of FIG. 1A, in which the implement is in an intermediate position.

FIG. 2B is a side view of an embodiment of the connector assembly 300 of FIG. 1B partially coupled to the implement 200 of FIG. 1, in which the implement 200 is in an intermediate position 260. As shown, the connector assembly 300 is rotated to a second connector angle 154 relative to the longitudinal axis 150 of the arm 110. In certain embodiments, the rotation is achieved by contraction of the tilt actuator 112. In certain embodiments, the controller coordinates movement of the drive system, the tilt actuator 112, the lift actuator 114, or a combination thereof, until the connector assembly 300 is aligned with the receiver assembly 400. For example, the connector assembly 300 may be tilted to the second connector angle 154 as the drive system moves the work vehicle forward, such that the connector assembly 300 rotates backward in pitch 123 and aligns with the receiver assembly 400. In certain embodiments, the connector assembly 300 may align with the receiver assembly 400 by tilting the connector assembly 300 to the second connector angle 154 as the lift actuator lifts the connector assembly 300, such that the protrusions 310 engage the recesses 402 of the receiver assembly 400. Accordingly, in certain embodiments, the connector assembly 300 may be aligned with the receiver assembly 400 by tilting the tilt actuator 112, lifting the arms 110, moving the work vehicle 100 forward, or a combination thereof.

In certain embodiments, the controller controls the movements of the actuators and the drive system by using dead reckoning from the starting position 250. For example, the controller may receive a signal indicative of the type of implement and/or measurements of the implement related to the automated coupling process. The controller may additionally access a stored database to retrieve measurements related to the implement to facilitate the automated coupling process. For example, after the controller identifies the starting position 250 of the automated coupled process (e.g., based on feedback from the sensors 302), the controller may instruct the tilt actuator 112 to move to a target tilt actuator position, instruct the lift actuator to move the mounting portion to a target mounting portion vertical position, instruct the drive system to move the work vehicle forward a target distance, or a combination thereof. After these movements, the connector assembly 300 may be coupled to the receiver assembly 400, as shown.

In certain embodiments, the controller controls movements of the actuators and the drive system based on feedback from the sensors 302. For example, during control of the drive system and/or the actuators, the sensors 302 disposed on the lower portion 326 of the front portion 314 of the connector assembly 300 may sense output signals to the controller indicative of a distance between the front portion 314 of the connector assembly 300 and the receiver assembly 400. When the distance is less than the threshold, the controller may determine that the connector assembly 300 is aligned with the receiver assembly 400.

Additionally, when the connector assembly 300 is aligned with the receiver assembly 400, the locking elements of the connector assembly 300 are aligned with the locking features of the receiver assembly 400. The controller may then instruct the actuators to move the extensions to the extended position such that the locking elements protrude into the corresponding locking features of the implement 200. Upon completion of the movement of the work vehicle 100, detection that the connector assembly 300 is aligned with the receiver assembly 400, engagement of the locking elements with the locking features of the implement, the parking brake may engage to block unintentional and/or undesired subsequent movement of the work vehicle.

Figure 2C:
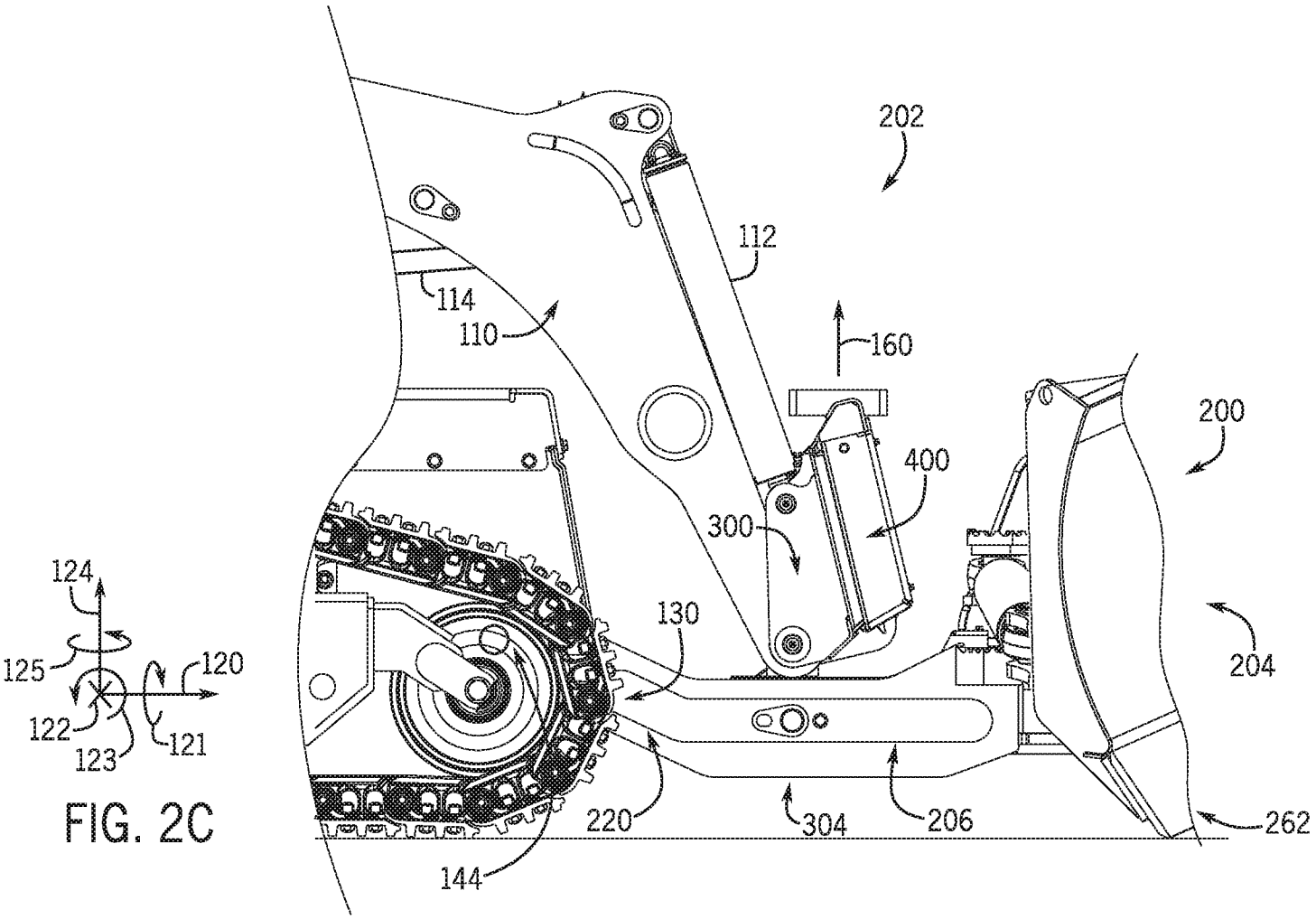
FIG. 2C is a side view of the connector assembly of FIG. 1B coupled to the implement of FIG. 1A, in which the implement is in the operating position.

FIG. 2C is a side view of the connector assembly 300 of FIG. 1B coupled to the implement 200 of FIG. 1A, in which the implement is in the operating position 202. As shown, the connector assembly 300 remains aligned and locked with the receiver assembly 400. Additionally, the controller may instruct a valve assembly to lock the tilt actuator 112, and then instruct the valve assembly to contract the lift actuator 114. The instructions may be provided sequentially or simultaneously. In this manner, the arm 110 lifts to apply a lifting force 160 in the vertical direction 124. In certain embodiments, the implement 200 is heavier at the working assembly 204 than at the mounting portion 220. Accordingly, a third point of rotation 262 of the implement 200 is located near the working assembly 204 of the implement 200 (e.g. at a contact point between the working assembly 204 and a ground beneath the working assembly 204). As such, when the lifting force 160 is applied to the implement 200 via the first connection 304, the mounting portion 220 of the implement 200 rotates upwardly to align with the corresponding locking features of the work vehicle.

In certain embodiments, the controller controls the application of the lifting force 160 based on dead reckoning, sensor feedback, or a combination thereof. In embodiments that use dead reckoning, the controller receives data indicative of the point of rotation of the implement 200, and/or a target of the mounting portion vertical position, to facilitate alignment the mounting portion 220 with the corresponding locking features. The controller then instructs the lift actuator 114 to achieve a target arm upward movement distance that moves the mounting portion 220 to the target mounting portion vertical position. In certain embodiments, the controller controls the movement of the mounting portion 220 based on signals from sensors. For example, a sensor disposed at or near the corresponding locking features of the work vehicle outputs a signal to the controller indicative of a proximity of the mounting portion 220 to the corresponding locking features. The controller may instruct the lift actuator to move the mounting portion 220 until the separation distance between the openings of the mounting portion 220 and the openings of the corresponding mounting features 144 is less than a threshold separation distance.

In certain embodiments, when the openings of the mounting portion are aligned with the openings of the corresponding locking features 144, the controller then instructs the actuators to move the locking elements into the corresponding locking features 144. In this manner, the implement 200 is coupled to the work vehicle 100 to form the first connection 304 and the second connection 130. As described in detail below with reference to FIG. 3, the tilt actuator 112 may be locked in position to block further tilting of the receiver assembly 400 during operation and/or the controller may disengage the parking brake.

Figure 3:
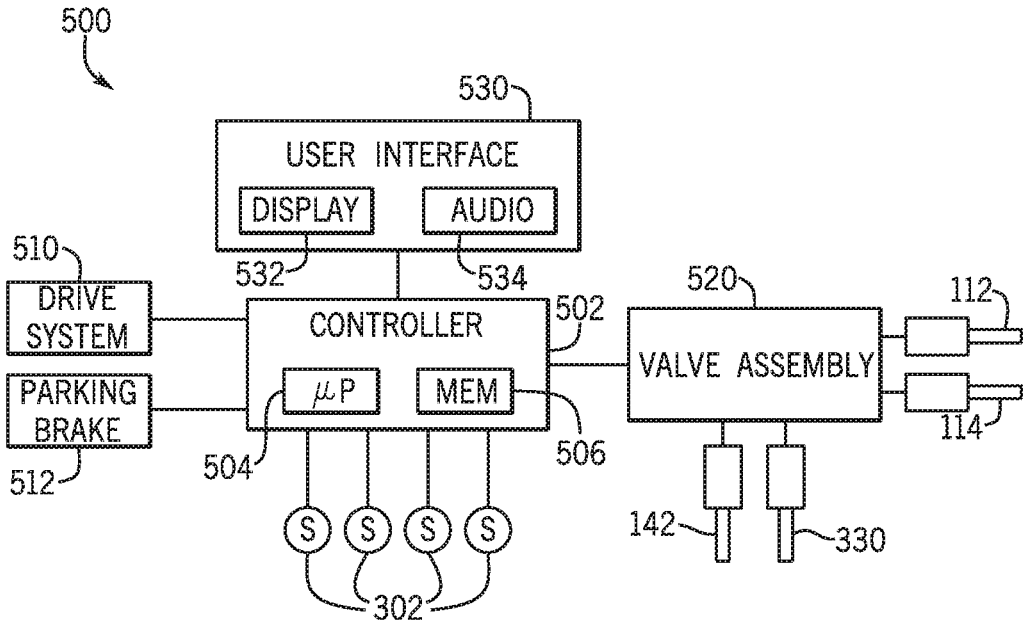
FIG. 3 is a schematic diagram of an embodiment of a control system for controlling the work vehicle of FIG. 1A.

FIG. 3 is a schematic diagram of an embodiment of a control system 500 for controlling the work vehicle 100 of FIG. 1. The control system 500 includes a controller 502. In certain embodiments, the control system 500 includes a drive system 510 communicatively coupled to the controller 502. As described above, the drive system 510 is configured to move the work vehicle and includes a rolling assembly. In the present embodiment, the drive system 510 includes tracks, but it is to be understood that wheels or another appropriate rolling assembly may be used instead. Further, a parking brake 512 is communicatively coupled to the controller 502 such that the controller may instruct the parking brake 512 to selectively engage to block movement of the track assembly while the controller 502 concurrently instructs the drive system 510 to stop.

In the illustrated embodiment, the controller 502 may be configured to instruct a valve assembly 520 to move actuators of the work vehicle. The valve assembly 520 may control a flow of working fluid (e.g., hydraulic fluid) to control the tilt actuator 112, the lift actuator 114, a first locking actuator 330 to drive the locking elements of the connector assembly, a second locking actuator 142 to drive the locking elements into the opening of the mounting portion of the implement, or any combination thereof. The valve assembly 520 may move the actuators 112, 114, 330, 142 to respective target positions (e.g., positions within a threshold range of the target positions).

In the illustrated embodiment, the controller 502 is communicatively coupled to a user interface 530. The user interface 530 may be located within the cab of the work vehicle. The user interface receives input from the operator, such as input for initiating the automated coupling process, controlling the implement, controlling the arm assembly, or a combination thereof, among others. In the illustrated embodiment, the user interface 530 is also configured to display informative notices related to the work vehicle and/or condition(s) of component(s) of the work vehicle via the display component 532. In certain embodiments, the informative notices may also be presented as audio messages via the audio component 534. The informative notices may include notices about the automated coupling process, the locations and/or conditions of components of the work vehicle and/or the implement, among others.

In the illustrated embodiment, the control system 500 also includes the sensors 302 communicatively coupled to the controller 502. As discussed above, the sensors 302 are disposed on the work vehicle. The sensors 302 may output signals indicative of distances, forces, strains, contacts, or any combination thereof, among others. The sensors 302 output the signals to the controller 502. In certain embodiments in which the automated coupling process is performed by dead reckoning, certain sensors 302 may be omitted. In such embodiments, the controller 502 may use the starting position of the connector assembly relative to the implement and target movements of components of the work vehicle to instruct the components and the drive system of the work vehicle to automatically move the components and the work vehicle to the target positions. While four sensors 302 are included in the illustrated embodiment, it is to be understood that a different quantity of sensors 302, such as zero, one, two, three, four, five, six, seven, eight, or more sensors may be communicatively coupled to the controller in alternative embodiments.

In certain embodiments, the controller 502 is an electronic controller having electrical circuitry configured to process data from certain components of the work vehicle, such as the user interface 530 and the sensors 302. In the illustrated embodiment, the controller 502 includes a processor, such as the illustrated microprocessor 504, and a memory device 506. The controller 502 may also include one or more storage devices and/or other suitable components. The processor 504 may be used to execute software, such as software for controlling the automated coupling process, and so forth. Moreover, the processor 504 may include multiple microprocessors, one or more "general-purpose" microprocessors, one or more special-purpose microprocessors, and/or one or more application specific integrated circuits (ASICS), or some combination thereof. For example, the processor 504 may include one or more reduced instruction set (RISC) processors.

The memory device 506 may include a volatile memory, such as random access memory (RAM), and/or a nonvolatile memory, such as read-only memory (ROM). The memory device 506 may store a variety of information and may be used for various purposes. For example, the memory device 506 may store processor-executable instructions (e.g., firmware or software) for the processor 504 to execute, such as instructions for controlling the work vehicle or controlling the automated coupling process. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the HVAC, etc.), and any other suitable data. The storage device(s) may store measurements and/or configurations of the implement for controlling the automated coupling process (e.g., via dead reckoning).

Figure 4:
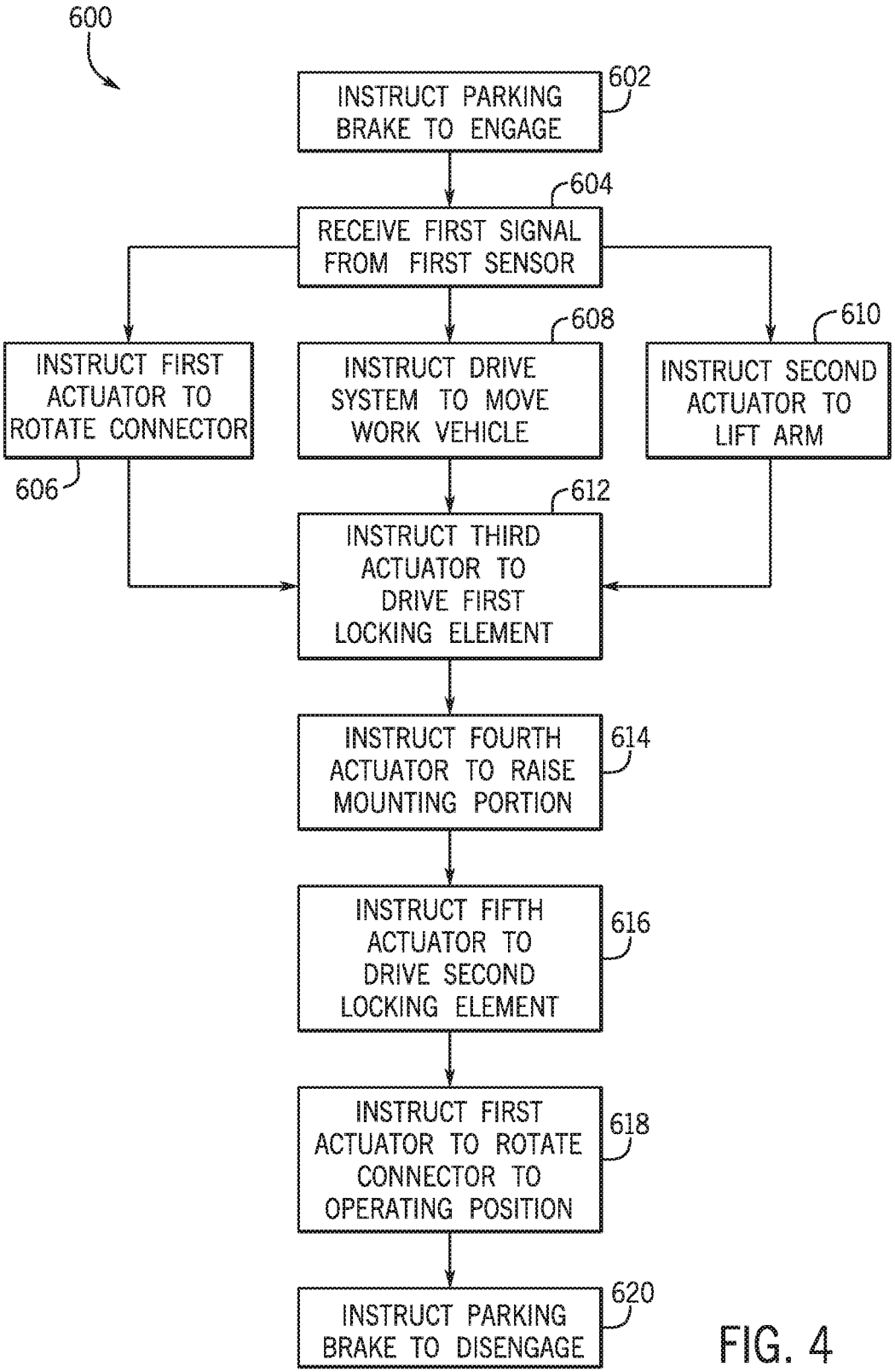
FIG. 4 is a flow diagram of an embodiment of a method for automatically coupling the implement of FIG. 1A to the work vehicle of FIG. 1A.

Present embodiments also include techniques that may be used to automatically couple the implement to the work vehicle. One approach is depicted in FIG. 4, which is a flow diagram of an embodiment of a method 600 for automatically coupling the implement of FIG. 1A to the work vehicle of FIG. 1A. In certain embodiments, the method 600 is performed at least in part by the controller of the work vehicle. As shown, the method 600 begins with instructing (block 602) a parking brake of the work vehicle to engage. The parking brake is configured to block movement of the rolling assembly of the drive system in place (e.g., block the wheels/tracks from rotating) when force is applied to the work vehicle. For example, if the arm of the work vehicle is being moved or the arm is manipulating an implement, an engaged parking break may slow and/or block movement of the work vehicle. The parking brake may be selectively disengaged for any automated movements of the work vehicle that involve operating the drive system (e.g., block 608), or the parking brake may alternatively be enabled only after any automated movements are performed.

The method 600 includes receiving (block 604) a first signal from a first sensor. The sensor may be configured to output a signal to the controller indicative of a distance between the connector assembly and the receiver assembly. The method 600 may also include any combination of instructing (block 606) the first actuator to rotate the connector assembly, instructing (block 608) the drive system to move the work vehicle, and instructing (block 610) the lift actuator to lift the arm. For example, the method 600 may include performing zero, one, two, or all three of the steps in any order. Accordingly, the listed order of steps of the method 600 is intended to be only an example of one way in which the automated coupling process may be performed.

For example, after the first signal is received, the method 600 may include instructing the tilt actuator to rotate the connector assembly and simultaneously instructing the lift actuator to lift the arm. In an additional example, the method 600 may include instructing the drive system to move the work vehicle forward. While the work vehicle is moving forward, the controller may additionally instruct the connector assembly to rotate rearward until the connector assembly is in an approximately vertical orientation. When instructing (block 608) the drive system to move the work vehicle, the controller may temporarily disengage the parking brake. By keeping the parking brake engaged except when the drive system is activated by undesired movements of the work vehicle may be substantially reduced or eliminated. Alternatively, the parking brake may be disengaged before block 608 is performed and be engaged after block 608 is performed.

Additionally or alternatively to instructing the drive system to move the work vehicle, the method may include instructing (block 610) the lift actuator to lift the arm. By lifting the arm, the connector assembly may be aligned with the implement. In particular, while the connector assembly is in the starting position, the controller may instruct the tilt actuator to contract, thereby rotating the connector assembly to a generally vertical orientation. The connector assembly may be tilted while the arm is being lifted, thus, sliding the protrusions of the connector assembly generally upwards along the implement until the protrusions are aligned with the recesses of the receiver assembly. Further, as described above, the locking elements of the connector assembly are aligned with the corresponding locking features of the receiver assembly.

Further, in certain embodiments, the method 600 includes instructing (block 612) the first locking actuator to drive the locking elements into engagement with the corresponding locking features of the receiver assembly. Accordingly, the first connection is established by the extensions of the locking elements, and the connector assembly is coupled to the receiver assembly in the intermediate position.

In embodiments with implements configured to couple to the work vehicle only at the connector assembly, the automated coupling process may include zero, one, or two of the two subsequent steps: instructing (block 614) the lift actuator to raise the mounting portion and instructing (block 616) the second locking actuator to drive the locking elements into engagement with the mounting portion.

For implements with a mounting portion, the method 600 may include instructing (block 614) the lift actuator to lift the implement such that the mounting portion of the implement is aligned with the corresponding mounting feature of the frame of the work vehicle. In certain embodiments, the implement has a point of rotation at the intersection between the working assembly and the ground. Accordingly, the implement rotates as the implement is lifted, such that the mounting portion raises until the mounting portion is aligned with the corresponding locking features of the frame. Then, the method may include instructing (block 616) actuators of the locking features to drive locking elements into the corresponding openings of the mounting portion of the implement. In this way, the implement is secured to the work vehicle to form the second connection.

The method 600 may additionally include instructing (block 618) the tilt actuator to rotate the connector assembly into an operating position. As the connector assembly is rotated, the receiver assembly is also rotated. Additionally, the controller may control the lift actuator in order to adjust a vertical position of the implement. These instructions may be provided to the tilt actuator and the lift actuator of work vehicles with implements coupled to the work vehicle to form either one or more connections.

As shown, the method 600 may further include instructing (block 620) the parking brake of the work vehicle to disengage. Accordingly, the implement is fully coupled to the work vehicle and prepared to be used to perform. In certain embodiments, the operator may then use the operator controls to manipulate the implement and perform work. The implement may transfer horizontal forces directly to the frame of the work vehicle. By transferring the horizontal forces to the frame instead of to the arms and/or arm assembly, the work vehicle may perform more work, as compared to implements only coupled to the work vehicle by the connector assembly on the arm of the work vehicle. However, the systems and methods disclosed herein may be compatible with implements only coupled to the work vehicle by the connector assembly.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system for automatically coupling an implement to a work vehicle, comprising:

a controller comprising a memory and a processor, wherein the controller is configured to:

receive a distance signal indicative of a separation distance between a connector assembly of an arm of the work vehicle and a receiver assembly of the implement before the implement is coupled to the work vehicle; and while the separation distance is less than a first threshold, instruct a first actuator to rotate the connector assembly of the work vehicle, instruct a drive system to move the work vehicle toward the implement, instruct a second actuator to lift the arm of the work vehicle, or a combination thereof, such that the connector assembly engages the receiver assembly.

2. The system of claim 1, wherein the controller is configured to instruct a third actuator when the separation distance is less than the first threshold to drive a first locking feature of the connector assembly into engagement with a first corresponding locking feature of the receiver assembly to couple the connector assembly to the receiver assembly.

3. The system of claim 1, wherein the controller is further configured to instruct a parking brake of the work vehicle to engage while the separation distance is less than the first threshold, instruct the parking brake to engage before sending [instructions] *the instruction* to the first actuator *to rotate the connector assembly*, or a combination thereof.

4. The system of claim 2, wherein the controller is further configured to: receive *from the third actuator* a first position signal [from the third actuator] indicative of a position of the first locking feature; and while the position is less than a second threshold, instruct the second actuator of the work vehicle to raise a mounting portion of the implement to a mounting position in which a second locking feature of the work vehicle is aligned with a second corresponding locking feature of the implement.

5. The system of claim 4, wherein when the mounting portion is in the mounting position, the controller is further configured to instruct a fourth actuator of the work vehicle to drive the second locking feature into engagement with the second corresponding locking feature.

6. The system of claim 5, wherein the controller is further configured to: receive *from the fourth actuator* a second position signal [from the fourth actuator] indicative of a position of the second locking feature; and when the second position signal is indicative of the second locking feature being engaged with the second corresponding locking feature, instruct the first actuator to rotate the connector assembly to an operating position.

7. The system of claim 6, wherein the first actuator comprises a hydraulic cylinder, wherein the controller is further configured to:

receive a third position signal indicative of a position of the first actuator; and when the third position signal is indicative of the connector assembly being in the operating position, instruct a valve assembly to block hydraulic fluid to and from the hydraulic cylinder.

8. The system of claim 6, wherein the controller is further configured to instruct a parking brake of the work vehicle to disengage when the second position signal is indicative of the second locking feature being engaged with the second corresponding locking feature.

9. A system for automatically coupling an implement to a work vehicle, comprising: a user interface configured to output an activation signal indicative of an activation of an automated coupling process; a first sensor disposed on a connector assembly of an arm of the work vehicle and configured to output a distance signal indicative of a separation distance between the connector assembly and a receiver assembly of the implement before the implement is coupled to the work vehicle; and a controller comprising a memory and a processor, wherein the controller is configured to perform the automated coupling process by: receiving *from the user interface* the activation signal [from the user interface] indicative of the activation of the automated coupling process; initiating the automated coupling process upon receiving the activation signal; receiving the separation distance signal from the first sensor; and while the separation distance is less than a first threshold and after the automated coupling process has been initiated, instructing a first actuator to rotate the connector assembly, instructing a drive system to move the work vehicle toward the implement, instructing a second actuator to lift the arm of the work vehicle, or a combination thereof, such that the connector assembly engages the receiver assembly.

10. The system of claim 1, wherein the connector assembly comprises a protrusion that is configured to engage a recess of the receiver assembly.

11. The system of claim 9, wherein the controller is further configured to: instruct a third actuator to drive a first locking feature of the connector assembly into engagement with a first corresponding locking feature of the receiver assembly to couple the connector assembly to the receiver assembly; receive a position signal indicative of a position of the first locking feature; and when the position signal is indicative of the first locking feature being extended, output *to the user interface* a completion signal [to the user interface] indicative of a completion of the automated coupling process, wherein the user interface is configured to present *to the operator* an indication [to an operator] indicative of the completion of the automated coupling process upon receiving the completion signal.

12. The system of claim 11, wherein the controller is further configured to disable manual control of the work vehicle upon receiving the activation signal, and wherein the controller is configured to enable manual control of the work vehicle when the position signal is indicative of the first locking feature being extended.

13. A method for automatically coupling an implement to a work vehicle, comprising:

receiving, via a controller, a distance signal indicative of a separation distance between a connector assembly of an arm of the work vehicle and a receiver assembly of the implement before the implement is coupled to the work vehicle; and instructing, via the controller while the separation distance is less than a first threshold, a first actuator to rotate the connector assembly of the work vehicle, a drive system to move the work vehicle toward the implement, a second actuator to lift the arm of the work vehicle, or a combination thereof, such that the connector assembly engages the receiver assembly.

14. The method of claim 13, comprising instructing, via the controller when the separation distance is less than the first threshold, a third actuator to drive a first locking feature of the connector assembly into engagement with a first corresponding locking feature of the receiver assembly to couple the connector assembly to the receiver assembly.

15. The method of claim 14, further comprising: receiving, via the controller *and from the third actuator*, a position signal [from the third actuator] indicative of a position of the first locking feature; instructing, via the controller when the position signal is indicative of the first locking feature being extended, the second actuator of the work vehicle to raise a mounting portion of the implement to a mounting position in which a second locking feature of the work vehicle is aligned with a second corresponding locking feature of the implement; and instructing, via the controller when the mounting portion is in the mounting position, a fifth actuator to drive the second locking feature of the work vehicle into engagement with the second corresponding locking feature of the implement.

16. The method of claim 15, further comprising instructing, via the controller when a locking feature signal of the fifth actuator indicates the second locking feature is engaged, the first actuator to rotate the connector assembly to a target operating position.

17. The method of claim 13, further comprising instructing, via the controller, a valve assembly to block a flow of hydraulic fluid to the first actuator during an operation mode of the work vehicle.

18. The method of claim 15, wherein instructing the second actuator of the work vehicle to raise the mounting portion of the implement is based on a mounting portion distance signal from a sensor, wherein the second sensor is disposed adjacent to the second locking feature of the work vehicle, wherein the mounting portion distance signal from the second sensor is indicative of a distance between the mounting portion of the implement and the second locking feature of the work vehicle, and wherein the second actuator raises the mounting portion of the implement to the mounting portion by raising the mounting portion until the mounting portion distance signal is indicative of the distance between the mounting portion and the second locking feature being less than a second threshold.

19. The method of claim 18, further comprising instructing, via the controller, the second actuator of the work vehicle to raise the mounting portion of the implement a target distance based on measurements of the implement stored in a memory of the controller.

20. The method of claim 13, further comprising: receiving *from a user*, via a user interface, an implement type signal [from a user] indicative of a type of the implement for coupling to the work vehicle; and adjusting, via the controller, a number of steps included in an automated coupling sequence based on the implement type signal.

* * * * *